Figure 1:
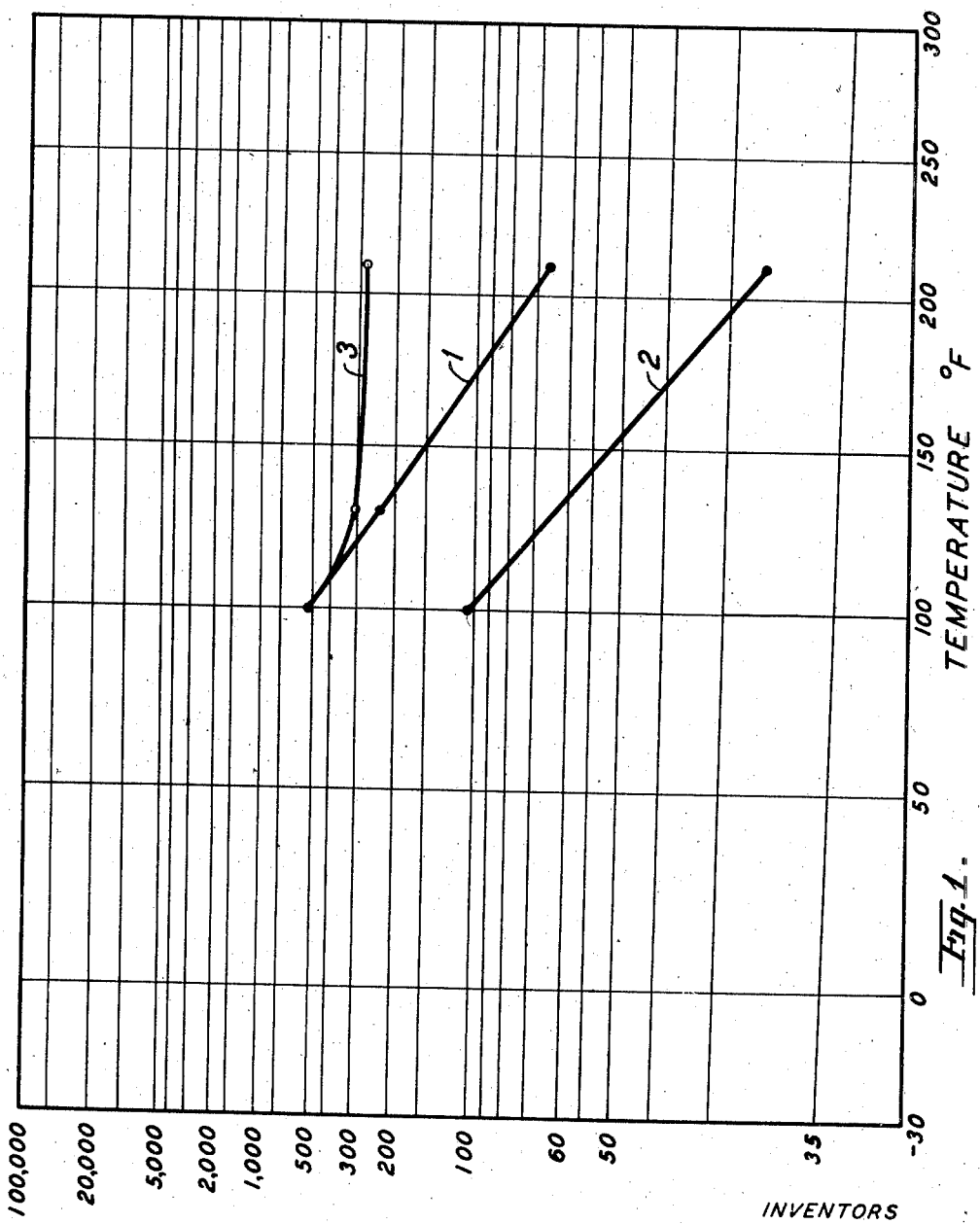

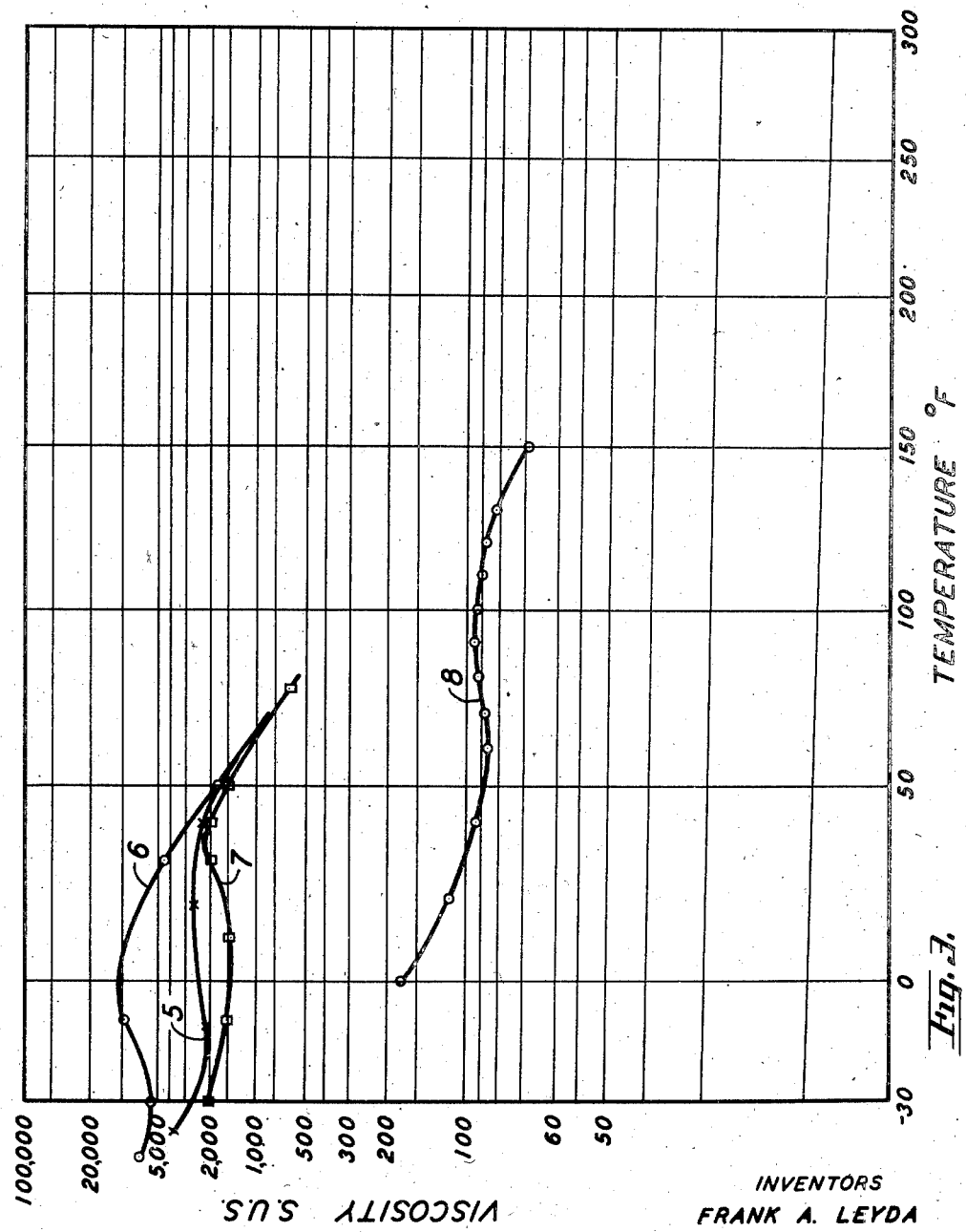

Patented Nov. 29, 1949

2,489,301

UNITED STATES PATENT OFFICE 2,489,301

LUBRICATING OILS AND THE LIKE

Edward G. Foehr, Berkeley, and Frank A. Leyda, Richmond, Calif., assignors to California Research Corporation, San Francisco, Calif., a corporation of Delaware Application April 4, 1947, Serial No. 739,292

8 Claims. (Cl. 252—37)

This invention relates to certain new and useful compositions having a hydrocarbon oil as the basic component and containing dispersed therein a high molecular weight, polymeric material having recurring polar substituents.

It is an object long sought in the art to produce lubricants and the like which exhibit little change of viscosity over a wide range of temperatures. Thus, in any application where a lubricant, insulating oil or the like is subjected in use to wide variations of temperature, it is desirable that the lubricant, insulating oil or the like have not too high a viscosity at the lower temperatures nor too low a viscosity at the higher temperatures. Thus, by way of example, a transformer oil, used to insulate and conduct heat away from the windings of a transformer, may be subjected to subzero temperatures in winter and to high temperatures during hot weather and while the transformer is dissipating a large amount of heat. If the oil becomes too viscous, it will not conduct heat readily. Hydraulic oils may be subjected to temperatures much below normal atmospheric (as in aircraft flying at high altitudes) or to elevated temperatures. If the oil becomes unduly viscous, it becomes sluggish and less responsive to mechanical pressure. In the operation of any machinery where the oil may become cold while the machinery is at rest and may become hot while the machinery is in operation, the oil may become so viscous and sluggish at low temperatures as to impede starting and acceleration and to cause excessive wear, or it may become so thin at high temperatures as not to provide sufficient "oiliness" for efficient lubrication.

As applied to hydrocarbon oils, these ends have been fulfilled in some measure in the past by various expedients, such as selecting base stocks (paraffinic) having high viscosity index (V. I.), refining oils to remove constituents which impart low V. I., and adding V. I. improvers. Most such means have fallen far short of the desired goal of a lubricant exhibiting relatively little viscosity change over a wide range of temperatures; the slope of the viscosity-temperature curve (reflecting change of viscosity with temperature) is reduced but not to anything approaching zero. Also, those method which rely upon selection of base stock exclude a large class of hydrocarbon oils (aromatic, naphthenic, etc.), which, except for their low V. I., have good properties as lubricants, insulating oils, etc. Those methods relying upon refining suffer loss of valuable hydrocarbon and non-hydrocarbon constituents (removed by the refining) and entail the use of expensive treating plants and chemicals.

It is an object of this invention to provide lubricants, insulating oils, hydraulic oils, castor machine oils, "Vistac" oils, drilling oils, gear lubricants, dash pot oils, scientific instrument lubricants and the like which exhibit relatively little change of viscosity over a wide range of temperatures.

It is a further object of the invention to provide a means whereby, starting from a hydrocarbon base stock and certain additive materials to be incorporated in the base stock in small amount, an oil can be produced exhibiting relatively little change of viscosity over a wide range of temperatures, which range of temperatures may be in the higher, lower or intermediate regions of temperature, as desired.

It is a particular object of the invention to provide means whereby a wide variety of petroleum lubricating oils, and in particular, aromatic or naphthenic type petroleum lubricating oils, can be modified to produce oils exhibiting relatively small change of viscosity over a wide range of temperatures.

It is a further particular object of the invention to provide lubricants and the like which, over an extended range of temperature, exhibit an increase in viscosity with rise of temperature.

These and other objects of the invention will be apparent from the ensuing description and the appended claims.

The compositions of this invention comprise a blend of hydrocarbon oil of suitable viscosity and a polar solvent, and a polymeric material stably dispersed in said blend, the polymeric material containing recurring polar substituents and being substantially insoluble in the hydrocarbon oil at ordinary atmospheric temperatures (i. e., about 77° F.).

A brief description of the functions of these ingredients will serve to clarify the nature of the invention.

It has been recently discovered that hydrocarbon oils of lubricating viscosity can be modified to produce oils having remarkably improved viscosity-temperature characteristics, by stably dispersing in the hydrocarbon oil a polymeric material as defined above. Suitable polymeric materials are ethyl cellulose of 45 to 50% ethoxyl content and others described hereinbelow, and suitable dispersing agents (to accomplish stable dispersion of the polymeric material in the oil) are aluminum soaps of high molecular weight fatty acids and others described hereinbelow.

In Fig. 1 of the drawings are shown viscosity-temperature curves of several oils. Such curves are referred to hereinafter as V-T curves. In Fig. 1 abscissae represent temperatures in degrees Fahrenheit and ordinates represent viscosities in Saybolt Seconds Universal. The scale is that of ASTM Standard Viscosity-Temperature Chart (D341-39).

Curve I of Fig. 1 is that of a conventional 100 V. I. oil, curve II is that of an aromatic type, low V. I. oil and curve III is that of an oil blended from 95.9 parts by weight of the same aromatic type oil, 1 part of ethyl cellulose (49.5% ethoxyl), 3 parts of aluminum soap of hydrogenated fish oil fatty acids and 0.1 part by weight of ethylene glycol. The blend was prepared by heating and mixing together the oil, ethyl cellulose and aluminum soap at 300° F. until a homogeneous blend was produced, then adding and stirring in the ethylene glycol.

The ethyl cellulose functioned to produce the flattening of the V-T curve; the soap, to maintain the ethyl cellulose in dispersed form when the blend had cooled; and the ethylene glycol, to inhibit separation and settling out of the ingredients upon prolonged exposure to elevated temperatures.

Similar oils, having, of course, different V-T curves but similarly exhibited a flattened portion of the V-T curve over a broad range of temperatures, can be produced by employing other hydrocarbon oils, other polymeric materials and other dispersing agents, such as described below. In all such cases, the principal ingredients are three in number; hydrocarbon oil, polymeric material and dispersing agent. The hydrocarbon oil serves as the major and basic ingredient; the polymeric material, to produce flattening of the V-T curve; and the dispersing agent, to maintain the polymeric material stably dispersed in the oil.

In producing the compositions of the present invention, similar ingredients are similarly blended to produce similar results, but there is also included in the composition a polar solvent which is effective to change the solubility relationship of the hydrocarbon base oil and the polymeric material, whereby certain advantages are obtained, such as shifting the flattened portion of the V-T curve to lower temperature, or rendering compatible with one another hydrocarbon oils and polymeric materials which are otherwise incompatible or which are difficultly compatible.

The several ingredients of the compositions of the present invention, their manner of compounding and the proportions in which they may be used will now be described in detail.

The principal ingredients are hydrocarbon oil, polymeric material, dispersing agent and polar solvent.

The hydrocarbon oil may have a viscosity of about 30 S. S. U. at 100° F. to 200 S. S. U. at 210° F. although oils of lower or higher viscosity may be required upon occasion. Preferably, this oil has a viscosity of 30 to 110 S. S. U. at 100° F. Petroleum and non-petroleum, natural and synthetic oils may be used; e. g., petroleum distillates from paraffinic, naphthenic, aromatic or mixed base crude petroleums, ranging from gas oils to cylinder oils; olefin polymers such as polypropylenes and polybutenes; amyl naphthalene; the lubricating fractions from synthetic petroleums (Fischer-Tropsch process, etc.), etc. However, petroleum lubricating oils are preferred, and of these the most advantageous are found to be the more aromatic type, such as those having about a 130°-160° F. aniline point, 30-110 S. S. U./100° F.; more viscous oils of equivalent aromaticity will have higher aniline points.

The preferred polymeric materials are ethers of cellulose with aliphatic alcohols of one to six carbon atoms. Such ethers are ordinarily made from mercerized cellulose and alkyl halides, and the phrase "ethers of cellulose with aliphatic alcohols" is used herein merely for convenience of description. Among these ethers, ethyl cellulose of 45% or higher ethoxyl content has been found to be most advantageous. Methyl, propyl, butyl, amyl and hexyl cellulose ethers may be used instead of ethyl cellulose, and these may vary widely in alkoxyl content; or mixed ethers, such as ethyl propyl cellulose, may be used.

Less desirably, but still within the operative limits of the invention, other polymeric materials of the class above indicated may be used in place of or in conjunction with a cellulose ether; e. g., cellulose esters, such as cellulose valerates, cellulose laurates; alkyd resins having only slight solubility in mineral lubricating oil; polyamides of the more oil-soluble type and which are condensation products of high molecular weight dibasic acids (such as sebasic acid) and high molecular weight diamines (such as decamethylene diamine); vinyl type polymers such as amyl ethers of polyvinyl alcohol and esters of polyvinyl alcohol with high molecular weight fatty acids; and acrylic esters such as butyl methacrylate. Those polymeric materials having recurring hydroxyl, substituted hydroxyl or carbonyl groups in the molecule are preferred.

The polymeric material should be such as is insoluble or sparingly soluble in the hydrocarbon base oil, such as petroleum lubricating oil, at ordinarily atmospheric temperatures, and it should have a molecular weight sufficient that, when the polymer dissolves in the oil by reason of the application of heat, it will increase the viscosity of the oil substantially. Also, the polymeric material should be of thermoplastic character.

Examples of suitable dispersing agents are oil-soluble polyvalent metal soaps such as aluminum oleate, aluminum stearate, aluminum naphthenate, aluminum soaps of cocoanut oil fatty acids, aluminum soaps of hydrogenated fish oil fatty acids, and mixed soaps such as a 50-50 mixture of aluminum oleate and aluminum stearate. Other metals may be used in place of aluminum, e. g., magnesium, calcium, barium, strontium and zinc, although aluminum soaps are preferred. These aluminum soaps may be normal soaps (aluminum trioleate, etc.) or basic soaps (aluminum dioleate, etc.). Similarly, normal and basic soaps of the other metals may be employed.

The polar solvent is preferably of a type which acts as a mutual solvent for the hydrocarbon base oil and the polymeric material, thereby increasing the solubility of the polymeric material in the oil. The polar solvent may, however, be of a type which is soluble only or mainly in the hydrocarbon base oil, or which acts as a solvent only or mainly for the polymeric material.

Examples of suitable polar solvents which act as mutual solvents are hydroxy compounds such as 2-butoxy ethanol, butyl lactate, butyl Carbitol (2-[β-butoxy ethoxy]-ethanol), methyl cyclohexanol, $C_8$ aliphatic alcohols (e. g., 2-octanol and 2-ethyl hexanol-1), and highly branched $C_{14}$ and $C_{17}$ aliphatic secondary alcohols (e. g., 7-ethyl-2-methylundecanol-4 and 3,9-diethyl tridecanol-6). Other polar solvents than those of the hydroxy type may also be used. Preferably, however, the polar solvent is of the hydroxy type, has a low pour point (below −40° F.), is completely miscible with mineral lubricating oil and is a good solvent for ethyl cellulose (but has different solvent properties for mineral lubricating oil and ethyl cellulose), has a sufficiently low viscosity that it does not increase substantially the viscosity of the final product and is non-aromatic. Additional desirable properties of the polar solvent are high flash point (above 180° F.) and immiscibility with water. The aforesaid $C_8$ and $C_{14}$ alcohols provide the optimum combination of desirable properties.

Blends of two or more polar solvents may also be used, e. g., octanol-2 and p-tert. amyl cyclohexanol; octanol-2 and 2-ethyl hexanol-1.

The compositions of the invention as thus far described comprise a hydrocarbon base oil, a polymeric material, a dispersing agent and a polar solvent. Advantageously, however, the compositions of the invention also comprise a fifth component, herein called a stabilizing agent. The stabilizing agent functions to inhibit separation and settling out of the ingredients upon prolonged exposure to elevated temperatures. A wide variety of materials may be used for this purpose, e. g., hydroxy compounds such as: low molecular weight polyhydric alcohols (e. g., ethylene glycol, glycerol); fatty acid esters of the same (e. g., glyceryl monostearate, glyceryl monoricinoleate); weak, oil-soluble fatty acids such as lauric, oleic, ricinoleic, abietic and naphthenic acids; stronger, oil-soluble acids such as petroleum sulfonic acids and half esters of dibasic acids such as phthalic and maleic acids with $C_{11}$ to $C_{16}$ alcohols (e. g., lauryl acid maleate, lauryl acid phthalate; oil-soluble phenolic compounds such as tertiary butyl catechol; and trimethylol propane. Also, high molecular weight ketones may be used, such as 16-hentriacontanone, and high molecular weight aliphatic acid amides, such as lauric and octadecanoic amides. These stabilizing agents have active hydrogen in the molecule and, except in the case of ethylene glycol and glycerol, they also contain a long chain aliphatic or cycloaliphatic group or several short chain aliphatic groups.

The compositions of the invention may also contain a corrosion and/or oxidation inhibitors; e. g., cetyl mercaptan, naphthylamine or 2,6-di-tertiary butyl-4-methyl phenol.

The above ingredients may be used in widely varying proportions, choice of proportions in any given instance depending upon a variety of factors such as the nature of the hydrocarbon base oil, the polymeric material, the polar solvent and the stabilizer; solubility of the polymeric material in the oil, etc. Generally, in 100 parts by weight of finished composition, the hydrocarbon base oil and polar solvent, taken together, will constitute about 85 to 99 parts (preferably about 92 to 98 parts), of which about 5 to 20 (preferably about 5 to 15) parts will be polar solvent and the balance, amounting to about 65 to 94 parts, will be hydrocarbon oil; the polymeric material will constitute about 0.5 to 6 parts, 0.5 to 3 parts being preferred; the dispersing agent, about 0.5 to 6 parts, 2 to 5 parts being preferred; the stabilizing agent, about 0.05 to 0.3 part, 0.1 to 0.2 part being preferred; and the corrosion and/or oxidation inhibitor, about 0.1 to 0.2 part.

The manner of compounding these ingredients to produce the compositions of the invention is likewise susceptible to considerable variation. Preferably, the dispersing agent and polar solvent are first dissolved in the hydrocarbon base oil by heating and stirring these ingredients together. If the polar solvent is so volatile that it would evaporate during the mixing and heating, the procedure may be carried out under pressure, or the base oil and dispersing agent may be mixed and heated to dissolve the dispersing agent in the oil, followed by cooling and addition of the polar solvent. After the blend of base oil, dispersing agent and polar solvent has been formed, the stabilizer and corrosion or oxidation inhibitor are dissolved in the oil-polar solvent-dispersing agent mixture by heating and stirring. Finally, the polymeric material is dispersed in the above mixture by heating and stirring, after which the product is allowed to cool. This particular sequence of steps is most advantageous, in that a superior product, having a more nearly level viscosity-temperature curve, is obtained. However, other compounding procedures may be used.

A few words with regard to theory will serve to guide one skilled in the art in selecting ingredients to perform a specific job. Such theory is not propounded by way of limitation of the invention, nor as the only possible explanation, but as a guide. Our theory is this: The normal effect of temperature on viscosity of a hydrocarbon oil is to thin the oil as temperature is increased and to thicken the oil as temperature is decreased. The polymeric material dispersed in an oil, in accordance with the invention, is, within a certain range of temperatures, partly dissolved in the oil and partly in the dispersed phase. As the temperature is raised, dispersed polymeric material dissolves in the oil and this opposes the normal thermal thinning effect. Contrariwise, when the oil is cooled, dissolved polymeric material passes out of solution into the dispersed phase, thus opposing the normal thickening effect of decrease in temperature. Outside of such range of temperatures, where the polymeric material is entirely dissolved or entirely in the dispersed phase, hence does not pass into or out of solution as the temperature is raised or lowered, such counteracting effect does not take place.

The function of the polar solvent, according to the theory, is to alter the solubility relationship of the hydrocarbon oil and polymeric material; making the latter more or less soluble in the former. Mutual solvents, which increase solubility of polymeric material in the oil, shift the flattened portion of the V-T curve to lower temperatures; solvent which depress solubility of the polymeric material in the hydrocarbon oil have the opposite effect.

By selecting a hydrocarbon base oil having greater solvent power for polymeric materials (e. g., more highly aromatic oils), or by selecting a more oil-soluble polymeric material (e. g., by selecting ethyl cellulose of 50% ethoxyl content rather than ethyl cellulose of 45% ethoxyl content, or by selecting propyl cellulose rather than ethyl cellulose of the same molar alkoxyl content), products having flattened V-T curves in lower regions of temperature result. Also, by selecting a polar solvent of the mutual solvent type, the flattened portion of the V-T curve is shifted to lower temperatures.

Figure 2:
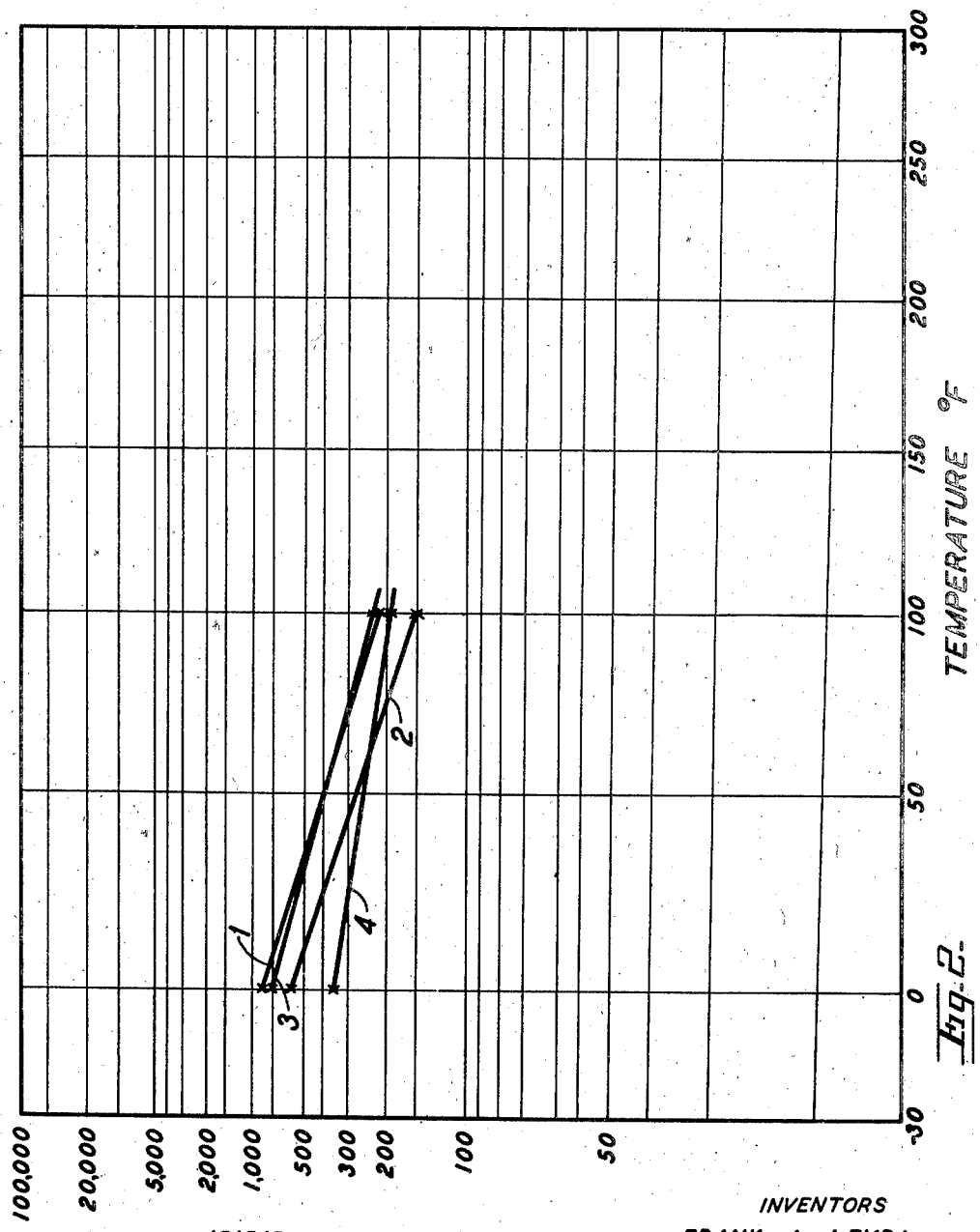

In Tables I and II below are shown the compositions of several products of the invention. Viscosities of these products are shown in Table I and in Figs. 2 and 3 of the drawings. In Figs. 2 and 3, abscissae represent temperatures (degrees F.) and ordinates represent viscosities (S. S. U.), the scale being that of ASTM Standard Viscosity-Temperature Chart (D341-39). Numbering of the curves corresponds to numbering of the products of Tables I and II.

Table I

| Composition (Weight percent) | Blend Number | | | |
|---|---|---|---|---|
| | 1 | 2 | 3 | 4 |
| Ethyl cellulose (47.6% ethoxyl content) | | 2.0 | | |
| Ethyl cellulose (49.4% ethoxyl content) | 2.0 | | 2.0 | 2.0 |
| Aluminum trioleate | 1.5 | 1.5 | 3.0 | 1.5 |
| Glyceryl monostearate | 0.2 | 0.2 | 0.2 | 0.2 |
| Butyl Carbitol | 20.0 | | | |
| 2-butoxy ethanol | | 20.0 | | 10.0 |
| Butyl lactate | | | 20.0 | |
| Mineral oil¹ (132° F. aniline point) | 76.3 | 76.3 | 74.8 | 86.3 |
| | 100.0 | 100.0 | 100.0 | 100.0 |
| Viscosity (S. S. U.): | | | | |
| 0° F | 851.2 | 588.3 | 743.7 | 351.7 |
| 100° F | 214.6 | 150.3 | 222.5 | 194 |

¹ This mineral oil was a blend of sulfuric acid treated distillates from a California wax-free naphthenic type crude. The viscosity of the blend was 57.7 S. S. U. at 100° F. and the aniline point was 140° F. This base oil was prepared by selecting a distillate of the approximate viscosity desired in the final oil and treating this lightly with sulfuric acid followed by neutralization with sodium hydroxide to yield the desired aniline point. The oils were then washed and finally given a light clay treatment.

Table II

| Composition (Weight percent) | Blend Number | | | |
|---|---|---|---|---|
| | 5 | 6 | 7 | 8 |
| Ethyl cellulose (49.4% ethoxyl) | 2 | 2 | 2 | 1 |
| Aluminum trioleate | 1 | 1 | 1 | 1.5 |
| Abietic acid | 0.2 | 0.2 | 0.2 | 0.2 |
| Methyl cyclohexanol | 10 | | | |
| 2-Ethyl hexanol-1 | | 10 | | |
| Octanol-2 | | | 10 | |
| Heptadecanol | | | | 6 |
| Mineral oil¹ | 86.8 | 86.8 | 86.8 | 91.3 |

¹ This mineral oil had an aniline point of 131° F., viscosity of 35.4 S. S. U./100° F. Otherwise, it was similar to the oil of Table I.

Some further information regarding selection and blending of materials to produce the compositions of the invention are provided below.

If ethyl cellulose is used as the polymeric material, it is preferably a product of such molecular weight as to have an intrinsic viscosity of about 0.5 to 2.6, most advantageously about 1.1 to 1.8, in a mixture of 80 parts by volume of C. P. toluene and 20 parts by volume of C. P. ethanol. Intrinsic viscosities can be calculated by the formula $$V = \left(\frac{ln V_r}{C}\right)_{C \to 0}$$

in which V is the intrinsic viscosity, $ln\, V_r$ is the natural logarithm of $V_r$, $V_r$ is the viscosity of the solution of polymer relative to that of the solvent and C is the concentration of the polymer in per cent by weight. The subscript, $C \to 0$, indicates that the intrinsic viscosity, V, is obtained by extrapolating $ln\, V/C$ from finite concentrations to zero concentration of polymer. This method is described by Kraemer and Lansing in Journal of Physical Chemistry, vol. 39, page 153.

Aluminum soaps have been found to be the best dispersing agents, and of these, the normal (or "tri") soaps, such as aluminum trioleate, produce the best results. These "tri" soaps are actually mixtures of tri- and di-soaps made from stoichiometric quantities of reactants, calculated to give the tri-soap. High purity of the soap, especially freedom from inorganic salts, results in a product less susceptible to separation of the components at elevated temperatures. The type of acid radical in the soap has a marked influence on pour point of the product; thus stearic acid soaps cause the product to have a relatively high pour point. Aluminum trioleate yields a product of especially low pour point.

Among the stabilizers, ethylene glycol tends to increase the viscosity level of the product. Glyceryl monostearate and monoricinoleate lower the viscosity level of the product and are also superior in preventing separation of the components.

Hydrocarbon base oils of too high aromaticity may cause some gelling of the product. More viscous base oils require a higher aromaticity than less viscous oils to provide sufficient solvent power for the polymeric material.

As stated, the proportions of the various ingredients of the compositions of the invention may vary within rather wide limits. In any given instance, however, the proportions used are important. Thus, too much or too little of some particular ingredient may not produce the desired effect on viscosity, or this effect may not be as great as desired or it may not occur in the desired range of temperatures. However, with the foregoing and the following supplemental instructions and with the specific examples hereinabove provided, one skilled in the art can determine the proper proportions to use in a given case.

It has been found, for example, that use of too little ethyl cellulose produces correspondingly less effect on viscosity whereas use of too much ethyl cellulose may cause phase separation. Too little dispersing agent allows phase separation; too much may cause an undesirably large increase of viscosity, or even gelling of the final product. Too little of the stabilizer allows phase separation, especially at elevated temperatures whereas if too much is used, it may not wholly dissolve or it may unduly raise the viscosity of the final product at low temperatures.

More specifically, where ethyl cellulose is dispersed in an aromatic type mineral lubricating oil and the polar solvent has mutual solvent properties for the oil and the ethyl cellulose, it is preferred not to use more than about 3% of ethyl cellulose. If more than 3% is used, the final product may have an undesirably high viscosity at low temperatures.

About 1 to 2% of dispersing agent, such as aluminum trioleate, has been found to be best with ethyl cellulose as the polymeric material. Ethyl cellulose of lower ethoxyl content requires a greater quantity of dispersing agent, usually about 50% more. The maximum quantity of dispersing agent is limited by its tendency to increase the viscosity of the final product at low temperatures.

Generally, about 5 to 15% of polar solvent (of the mutual solvent type) will be used, preferably no more than about 10% where the polar solvent is viscous (otherwise, an unduly high viscosity at low temperatures may result). If a non-viscous polar solvent (mutual solvent type) is used, a higher concentration of ethyl cellulose is required to produce the desired effect on viscosity. This, in turn, may lead to a product of unduly high viscosity at low temperatures.

It will be understood that these remarks regarding optimum materials, proportions, etc., are provided to instruct one skilled in the art how to prepare compositions having the best possible combination of properties, such as the greatest possible flattening of the V-T curve, the highest resistance to phase separation, low pour point and low viscosity at low temperatures. The invention, however, contemplates and includes compositions having less than the optimum combination of desirable properties. Thus, where only a moderate flattening of the V-T curve is required, or where phase separation at high temperatures, high viscosity at low temperatures or high pour point is allowable, or where all or several of these properties are allowable, compositions so characterized may be produced in accordance with the principles of and are within the scope of this invention.

We claim:

1. A normally liquid composition of lubricating viscosity consisting essentially by weight of about 65 to 94 per cent of a hydrocarbon lubricating oil; about 0.5 to 6 per cent of a high molecular weight thermoplastic material dispersed in said lubricating oil, said thermoplastic material having recurring oxygen-containing polar groups and being substantially insoluble in the lubricating oil at normal atmospheric temperatures; about 0.5 to 6 per cent as dispersing agent of an oil-soluble, polyvalent metal soap of a fatty acid to maintain the polymeric material dispersed in the lubricating oil, and about 5 to 20 per cent of an oxygen-containing polar solvent solubilizing agent for the polymeric material, said polar solvent being miscible with the lubricating oil.

2. A composition substantially as described in claim 1, wherein the hydrocarbon lubricating oil is a petroleum lubricating oil.

3. A composition substantially as described in claim 1, wherein the polymeric material is an ether of cellulose and a low molecular weight aliphatic alcohol.

4. A composition substantially as described in claim 1, wherein the dispersing agent is an aluminum soap of a fatty acid.

5. A composition substantially as described in claim 1, wherein the polar solvent is an aliphatic alcohol having 8 to 14 carbon atoms in the molecule.

6. A normally liquid composition of lubricating viscosity consisting essentially of by weight about 65 to 94 parts of a mineral lubricating oil having a viscosity between about 30 and 110 S. S. U. at 100° F. and an aniline point between about 130° and 160° F.; about 0.5 to 6 parts of ethyl cellulose dispersed in said lubricating oil, said ethyl cellulose having an ethoxyl content of at least 45 per cent and an intrinsic viscosity between about 1.1 and 1.8 in a mixture by volume of 80 parts toluene and 20 parts ethanol; about 0.5 to 6 parts of an aluminum soap of a higher fatty acid to maintain the polymer dispersed in the lubricating oil; about 5 to 20 parts of an oxygen-containing polar solvent solubilizing agent for the ethyl cellulose, said polar solvent being miscible with the mineral lubricating oil.

7. A composition substantially as described in claim 6, wherein the polar solvent has a flash point of at least about 180° F.

8. A composition substantially as described in claim 6, wherein the polar solvent is 2-butyl ethanol.

EDWARD G. FOEHR.
FRANK A. LEYDA.

REFERENCES CITED

The following references are of record in the file of this patent:

UNITED STATES PATENTS

| Number | Name | Date |
|---|---|---|
| 2,104,408 | Wiezevich | Jan. 4, 1938 |
| 2,261,577 | Batchelder | Nov. 4, 1941 |
| 2,275,123 | Zimmer et al. | Mar. 3, 1942 |
| 2,392,530 | Hamilton et al. | Jan. 8, 1946 |
| 2,407,954 | Fenske | Sept. 17, 1946 |
| 2,411,150 | Evans et al. | Nov. 19, 1946 |